United States Patent [19]

Mardirosian

[11] Patent Number: 4,648,100
[45] Date of Patent: Mar. 3, 1987

[54] CARRIER RECOVERY CIRCUIT

[75] Inventor: John Mardirosian, Acton, Mass.

[73] Assignee: AT&T Bell Laboratories, Murray Hill, N.J.

[21] Appl. No.: 717,288

[22] Filed: Mar. 28, 1985

[51] Int. Cl.[4] .................... H03D 3/22; H04L 27/22
[52] U.S. Cl. .................................. 375/86; 375/39; 375/120; 329/50
[58] Field of Search ............... 375/97, 83, 86, 120, 375/81, 39, 42; 329/124, 50, 104

[56] References Cited

U.S. PATENT DOCUMENTS

| | | | |
|---|---|---|---|
| 4,057,762 | 11/1977 | Namiki | 329/50 |
| 4,283,682 | 8/1981 | Sifford et al. | 329/50 |
| 4,458,356 | 7/1984 | Toy | 375/120 |
| 4,538,111 | 8/1985 | Giusto | 375/86 |

Primary Examiner—Jin F. Ng
Assistant Examiner—M. Huseman
Attorney, Agent, or Firm—David R. Padnes

[57] ABSTRACT

A carrier recovery circuit which phase aligns receiver-generated, quadrature-related carrier signals to incoming modulated, quadrature-related carrier signals is disclosed. The amplitudes of these modulated carriers determine data points in a signal-space diagram. In the carrier recovery circuit, the amplitude of each of said modulated carrier signals is sensed relative to thresholds which pass through the outermost data points in the signal-space diagram. These outermost data points form a periphery when interconnected by straight lines which encompass all of the data points. A phase error signal is generated which maintains phase alignment of the receiver-generated carriers to the incoming carriers when the sensed amplitudes fall in selected regions of the signal-space diagram lying outside of the aforementioned periphery.

19 Claims, 7 Drawing Figures

FIG. 5
LOCATION OF CATEGORY I
REGIONS

ONLY OUTERMOST DATA POINTS
SHOWN FOR CLARITY

*FIG. 6*

LOCATION OF CATEGORY 2 REGIONS

ONLY OUTERMOST DATA POINTS SHOWN FOR CLARITY

FIG. 7
PHASE DETECTOR OUTPUT

ONLY OUTERMOST DATA POINTS SHOWN FOR CLARITY

CARRIER RECOVERY CIRCUIT

TECHNICAL FIELD

The present invention relates to digital communications systems which transmit data by modulating quadrature-related carrier signals and, more particularly, to a carrier recovery circuit for use in the receiver of such systems.

BACKGROUND OF THE INVENTION

In a number of digital communications systems, the transmitted signal is formed by linearly adding quadrature-related carrier signals which have been modulated with digital data. Any of a number of specific modulation schemes, known as phase shift keying (PSK), quadrature amplitude modulation (QAM) and amplitude and phase shift keying (APSK), can be used. Such modulation schemes can be presented by a two-dimensional signal-space diagram having four quadrants. Within this diagram, a data point, representing a portion of data from each of the demodulated carriers, is plotted for each of the received data combinations.

In the receiver of these communications systems, the received signal is demodulated using receiver-generated carriers and the digital data is regenerated. These receiver-generated carriers must be synchronous with the carrier signals used at the transmitter. Since the transmitter carrier signals are often suppressed by the modulation process and the propagation through a dispersive transmission channel, the information necessary to phase align the receiver-generated carriers to the transmitter carrier signals must be derived from the received signal. The circuitry which provides these phase aligned, receiver-generated carrier signals is called a carrier recovery circuit.

Carrier recovery circuits can be categorized depending on how the phase aligning or phase error signal is derived. One category includes those circuits which derive a reference signal at the carrier frequency, or some harmonic thereof, by nonlinear processing of the received signal before demodulation. These circuits usually do not meet the low phase jitter objectives required in many system applications. A second category of carrier recovery circuitry, known as baseband carrier recovery circuits, derives a phase error signal by processing the received signal after demodulation. While this second category of circuits reduces the phase jitter, the processing is generally limited to a particular type of demodulation. In addition, many baseband carrier recovery circuits do not provide satisfactory phase error tracking during periods of severe distortion, such as signal fading. It would, therefore, be desirable to develop a carrier recovery circuit which provides low jitter, phase error tracking over a greater range of received signal distortion and is applicable to a number of modulation formats.

SUMMARY OF THE INVENTION

The carrier recovery circuit, in accordance with the present invention, phase aligns receiver-generated, quadrature-related carrier signals to incoming modulated, quadrature-related carrier signals. To overcome the limitations of the prior art, phase alignment is provided by a scheme which relies on the invariant shape of the signal-space diagram determined by the amplitudes of the modulated carrier signals. Specifically, in the carrier recovery circuit, a phase difference detector senses the amplitude of each of the incoming carrier signals relative to thresholds which pass through the outermost data points in the signal-space diagram. A phase error signal is then generated when the sensed amplitudes fall in selected regions of the signal-space diagram lying outside of a periphery formed by the interconnection of the aforementioned outermost data points.

DETAILED DESCRIPTION

Figure 1:
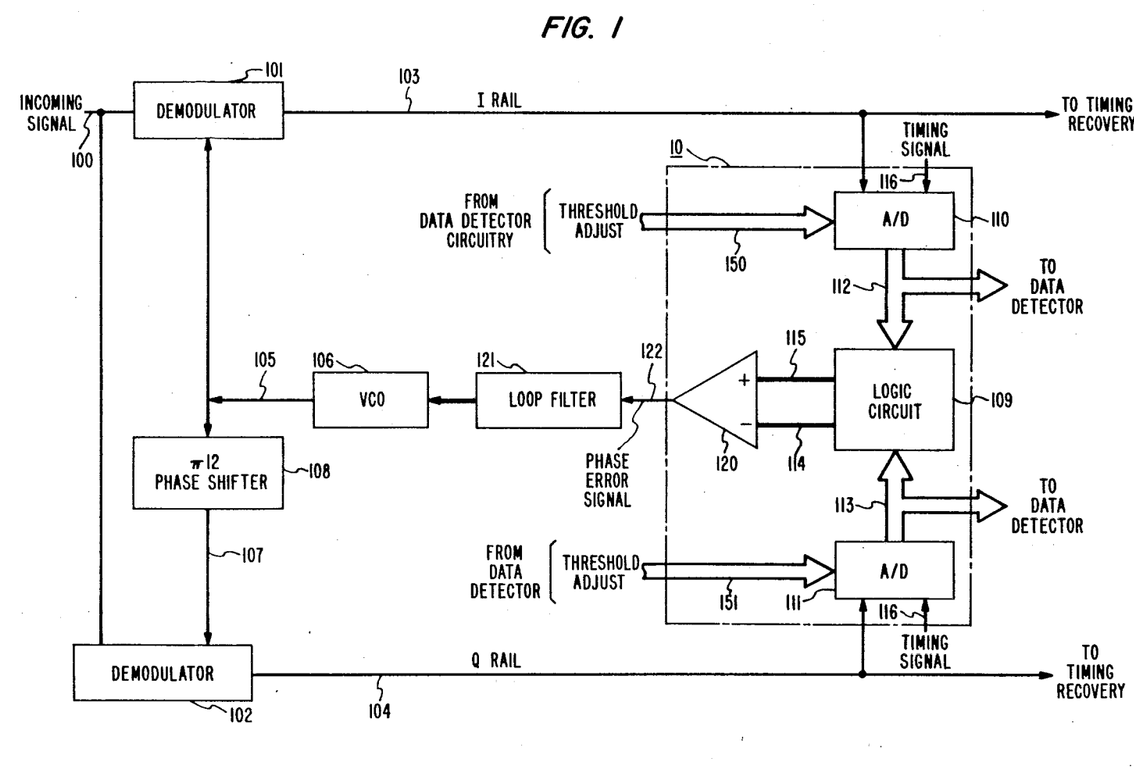
FIG. 1 is a block schematic diagram of a carrier recovery circuit in accordance with the present invention.

FIG. 1 shows a carrier recovery circuit within the receiver of an illustrative 64 QAM digital radio system. At the transmitter (not shown), two quadrature-related carriers are modulated by two digital data channels. Both carriers are at some preselected intermediate frequency (IF). After modulation, the quadrature-related carriers are linearly added and then are translated or "up-converted" to radio frequency carriers. After propagation through a suitable transmission medium, the transmitted radio signals enter a receiver where they are translated or "down-converted" back to IF.

The incoming signal on lead 100, comprising the modulated IF quadrature-related carriers, is coupled to demodulators 101 and 102 which, respectively, form digital data channels 103 and 104. Channel 103, commonly called the I or in-phase rail, and channel 104, commonly called the Q or quadrature rail, each comprise amplitude-modulated pulses. The I and Q rails are supplied to well-known timing recovery circuitry within the receiver. Such circuitry is used to control the sampling of the I and Q rails from which the digital data in the transmitter is reconstructed.

Demodulator 101 generates channel 103 by multiplying the signal on lead 100 by a first receiver-generated carrier on lead 105. The first receiver-generated carrier is produced by voltage-control oscillator (VCO) 106. Similarly, demodulator 102 generates digital data channel 104 by multiplying the signal on lead 100 by a second receiver-generated carrier on lead 107. This second receiver-generated carrier is formed by phase shifting the first receiver-generated carrier by $\pi/2$ radians via phase shifter 108. Hence, the first and second receiver-generated carriers are quadrature-related carriers.

To provide coherent demodulation, the first and second receiver-generated carriers are phase aligned to the quadrature-related carriers in the signal on lead 100 by means of a phase error signal generated on lead 122. This phase error signal is generated by phase detector 10 in response to the demodulated data on the I and Q rails which falls within selected regions of the signal-space diagram.

Figure 2:
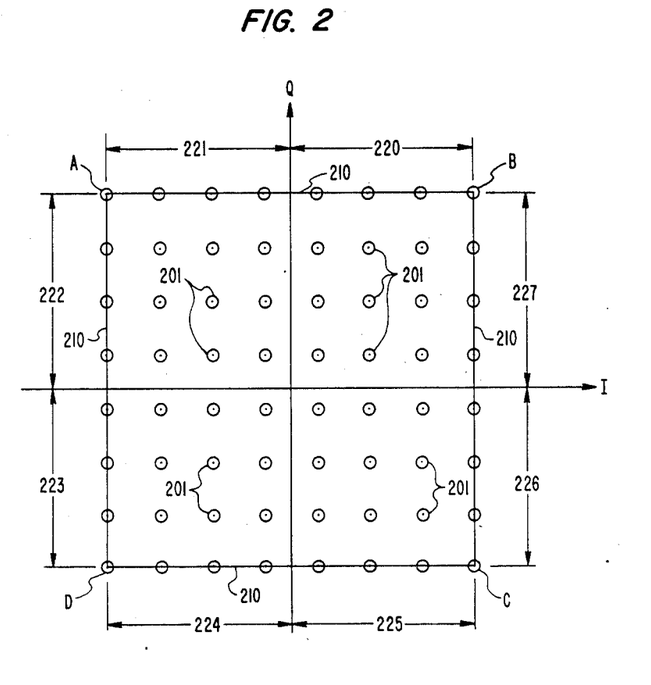
FIG. 2 is a signal-space diagram of an illustrative 64 QAM signal showing the periphery formed by the interconnection of the outermost data points.

Refer now to FIG. 2 which illustrates a 64 QAM signal plotted on a signal-space diagram. It is assumed that the receiver-generated carrier signals are phase-aligned to the quadrature-related carriers in the signal on lead 100. The signal-space diagram includes 64 data points 201 lying in the four quadrants defined by the I and Q axes. Four of the 64 data points are outermost data points and are designated as "A", "B", "C" and "D". In this signal-space diagram, the outermost data points are those which are furthest from the origin, i.e., the intersection of the I and Q axes. In general, for any modulation format, the outermost data points are those points which when interconnected by straight lines form a periphery which includes all of the data points in a minimum area on the signal-space diagram. As shown, the interconnection of outermost data points "A", "B", "C" and "D" by straight lines forms periphery 210 which encompasses all of the 64 data points. Lying outside of periphery 210 are regions 220, 221, 222, 223, 224, 225, 226 and 227 of the signal-state diagram. Each of these regions extends to infinity, is bounded by a side of periphery 210, a straight line extension of another side of periphery 210, and the I or Q axis. Each region includes no data points other than those on periphery 210.

Each of the 64 data points has an I and Q component with each component determined by the data in channels 103 and 104. Ideally, i.e., in the absence of any distortion, the values of the I and Q components in the illustrative 64 QAM signal are ±1, ±3, ±5, ±7 volts. The presence of noise and distortion, such as multipath fading, however, causes variations in the I and Q components. These variations result in a smearing or widening of each data point into small circles as shown in FIG. 2. It should be noted that while the smearing effect causes an expansion or contraction of the periphery 210, the shape of this periphery is unaffected by phase error, i.e., the lack of phase alignment between the receiver-generated carrier signals and the quadrature-related carriers within the signal on lead 100. This property forms the basis for the operation of phase detector 10.

Figure 3:
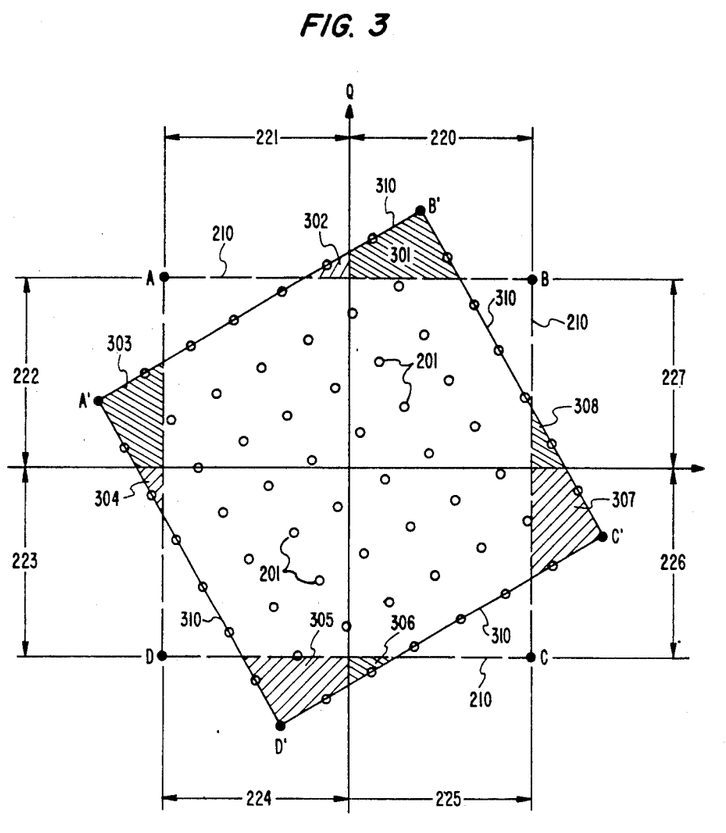
FIGS. 3 and 4 are plots of the signal-space diagram of FIG. 2 during arbitrary positive and arbitrary negative phase errors, respectively.

FIG. 3 shows the effects of an arbitrary positive phase error on the signal-space diagram of FIG. 2. For illustrative purposes, periphery 210 and regions 220, 221, 222, 223, 224, 225, 226 and 227 are also shown. Positive phase error, i.e., the receiver-generated carriers lead the quadrature-related carriers in the signal on lead 100, results in a counterclockwise rotation of the data points in the signal-space diagram about the origin. Numeral 310 designates the periphery formed by the interconnection of outermost data points A', B', C' and D' in the counterclockwise rotated signal-space diagram. As illustrated, data points in the rotated signal-space diagram lie outside of periphery 210 and fall in regions 220 through 227. As shown, portions 301, 302, 303, 304, 305, 306, 307 and 308 within periphery 310 of the signal-space diagram fall in regions 220, 221, 222, 223, 224, 225, 226 and 227, respectively. It should be noted that more of the signal-space diagram and more of the data points fall in the even-numbered regions 220, 222, 224 and 226 than in the odd-numbered regions 221, 223, 225 and 227 during a positive phase error.

Figure 4:
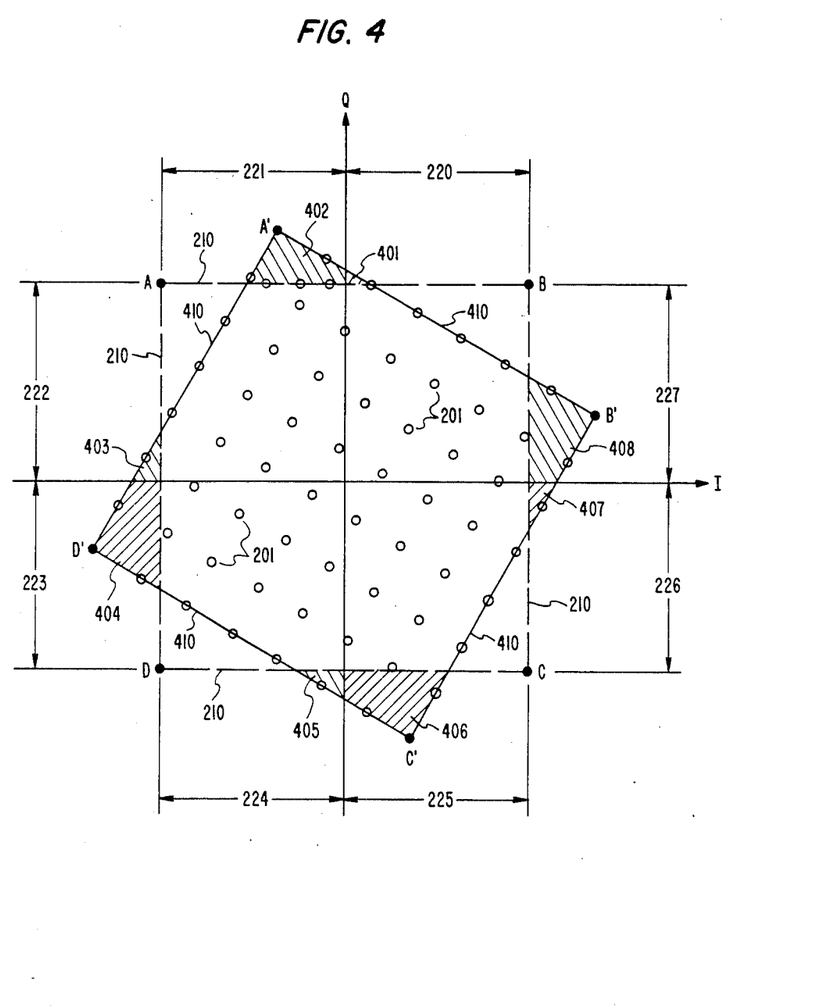

The effects of an arbitrary negative phase error, i.e., the receiver-generated carrier signals on leads 105 and 107 lag the quadrature-related carriers in the signal on lead 100, are shown in FIG. 4. Periphery 210 and regions 220 through 227 are also shown. Negative phase error causes a clockwise rotation of the 64 QAM data points with respect to the origin. Numeral 410 designates the periphery formed by the interconnection of outermost data points A", B", C" and D". As shown, some of the data points fall outside of periphery 210 and within regions 220-227. Specifically, portions 401, 402, 403, 404, 405, 406, 407, 408 and 409 within periphery 410 fall in regions 220, 221, 222, 223, 224, 225, 226 and 227, respectively. Note that more of the clockwise-rotated signal-space diagram and more of the data points fall in the odd-numbered regions 221, 223, 225 and 227 than in the even-numbered regions 220, 222, 224 and 226 during a negative phase error. Accordingly, assuming a uniform probability of any data point occurrence, positive and negative phase errors can be determined by detecting differences between the number of data points falling in the even-numbered regions 220, 222, 224 and 226 as compared to the number of data points falling in the odd-numbered regions 221, 223, 225 and 227.

Referring to FIG. 1, phase detector 10 comprises A/D converters 110 and 111, which are connected, respectively, to channels 103 and 104, logic circuit 109 and difference amplifier 120. Each A/D converter assigns the signals in the connected channel to the closest one of a plurality of thresholds at selected times and outputs a digital word corresponding to each assignment. These digital words from A/D converters 110 and 111 are representations of the I and Q components of the data points. These digital word representations appear on buses 112 and 113 and are supplied to logic circuit 109 and the baseband data detector in the receiver. The selected times are the optimum sampling times for regenerating the transmitter digital data channels and are controlled by a timing signal on lead 116. This timing signal is generated by well-known timing recovery circuitry. For A/D converter 110, one of the plurality of thresholds passes through the periphery line BC which interconnects outermost data points B and C and another one of the thresholds passes through the periphery line AD which interconnects outermost data points A and D as shown in FIG. 2. The remaining thresholds are parallel and to the left of line AD, parallel and to the right of line BC and parallel and in between lines AD and BC. Similarly, for A/D converter 111, one of the plurality of thresholds passes through periphery line AB which interconnects outermost data points A and B and another one of the thresholds passes through the periphery line DC which interconnects outermost data points D and C. The remaining thresholds of A/D converter 111 are parallel and below line DC, parallel and above line AB and parallel and in between lines AB and DC. Each of the A/D converter thresholds and the digital word representations are also adaptive, i.e., they track the movement of the data points caused by distortion in the received signal on lead 100. Specifically, each threshold is adjusted to equal the averaged value of all data which have been assigned to that threshold. This adaptive feature is provided by threshold adjust signals on buses 150 and 151. These threshold adjust signals are generated by well-known circuitry in the baseband data detector. An example of such well-known circuitry is disclosed in U.S. Pat. No. 4,449,102 to Frazer, issued May 15, 1984.

Each of the digital word representations on buses 112 and 113 includes a polarity bit (the most significant bit), a second most significant bit, a third most significant bit, and a fourth most significant bit. We will designate the polarity bit for each word representation on bus 112 and bus 113 by SPI and SPQ, respectively; the second most significant bit for each word representation on buses 112 and 113 by S1I and S1Q, respectively; the third most significant bit for each word representation on buses 112 and 113 by S2I and S2Q, respectively, and the fourth most significant bit for each word representation on buses 112 and 113 by EPI and EPQ, respectively. Polarity bit SPI is positive or logical "1" for all I components of a data point lying to the right of the Q axis and is negative or logical "0" for all I components of a data point lying to the left of the Q axis. Polarity bit SPQ is positive or logical "1" for all Q components of a data point lying above the I axis and is negative or logical "0" for all Q components of a data point lying below the I axis. Furthermore, when the assigned threshold from A/D converter 110 lies to the right of line BC in FIG. 2, SPI, S1I, S2I and EPI in the word representation on bus 112 are all logical "1" and when the assigned thresholds lie to the left of line AD in FIG. 2, these bits in the assigned threshold word representation are all logical "0". Similarly, when the assigned threshold lies above line AB in FIG. 2, SPQ, S1Q, S2Q and EPQ in the word representation on bus 113 are all logical "1" and when the assigned threshold lies below line DC in FIG. 2, these bits in the assigned threshold word representation are all logical "0". Therefore, the four most significant bits outputted by A/D converters 110 and 111 indicate when the demodulated received signal at any of the selected times is within or outside of periphery 210.

Figure 5:
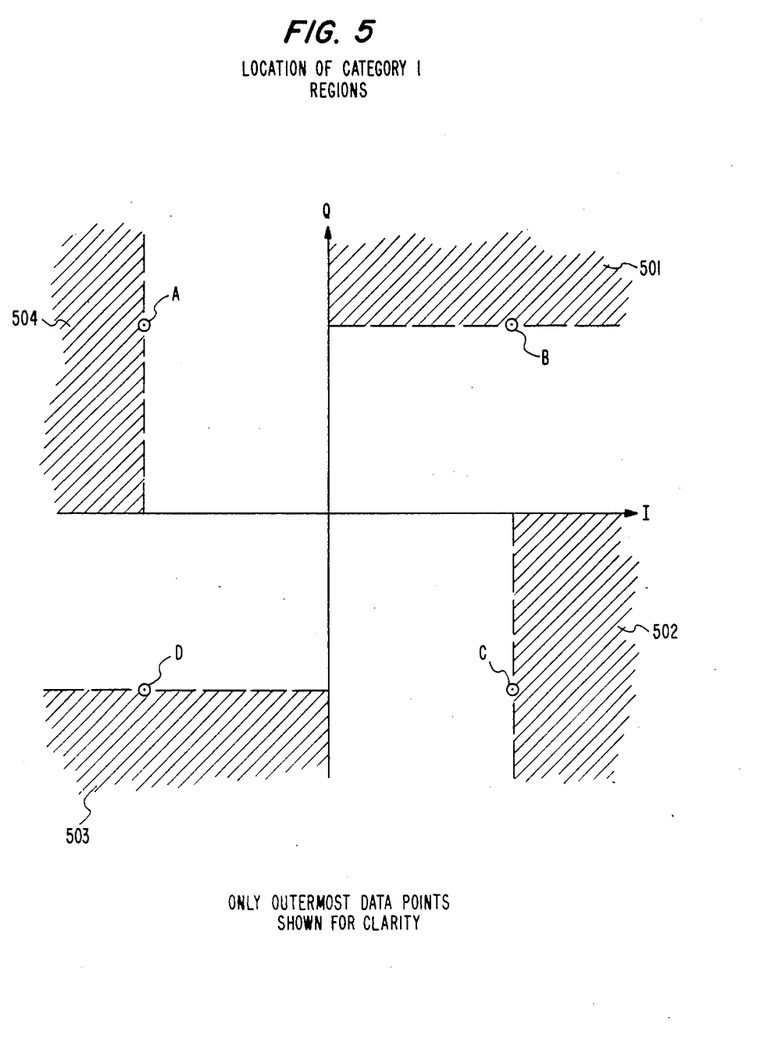
FIGS. 5 and 6 are regions of the signal-space diagram wherein the occurrence of data points contributes to any positive and any negative phase error, respectively.
Figure 6:
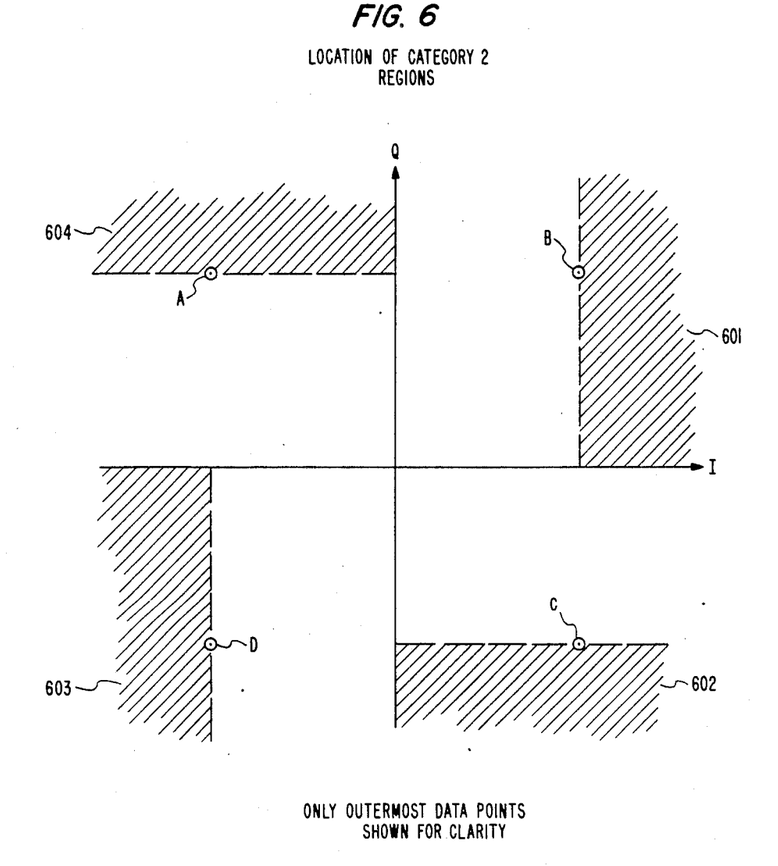

FIGS. 5 and 6, respectively, show the regions of the signal-space diagram in which the occurrence of data points reflects any positive and any negative phase error. FIG. 5 shows four regions, hereinafter referred to as category 1 regions, which are designated as 501, 502, 503 and 504. FIG. 6 also shows four regions, hereinafter referred to as category 2 regions, which are designated 601, 602, 603 and 604. The occurrence of data points in any of these regions can be determined from an examination of the four most significant bits from A/D converters 110 and 111. In discussing this examination, the following notation will be used:

$$I1 = SPI \cdot S1I \cdot S2I \cdot EPI; \quad (1)$$

$$I2 = \overline{SPI + S1I + S2I + EPI}; \quad (2)$$

$$Q1 = SPQ \cdot S1Q \cdot S2Q \cdot EPQ = ; \quad (3)$$

and $$Q2 = \overline{SPQ + S1Q + S2Q + EPQ} = ; \quad (4)$$

where the · and +, respectively, indicate a Boolean AND and OR operation and the line over a term or terms indicates the logical complement.

Using the above equations, a data point occurs in any region of FIG. 5 and FIG. 6 when the Boolean AND expression for the region, shown in Table A, is equal to logical "1".

TABLE A

| Region | Expression |
|---|---|
| 501 | Q1 · SPI |
| 502 | I1 · $\overline{SPQ}$ |

TABLE A-continued

| Region | Expression |
|---|---|
| 503 | Q2 · $\overline{SPI}$ |
| 504 | I2 · SPQ |
| 601 | I1 · SPQ |
| 602 | Q2 · SPI |
| 603 | I2 · $\overline{SPQ}$ |
| 604 | Q1 · $\overline{SPI}$ |

Figure 7:
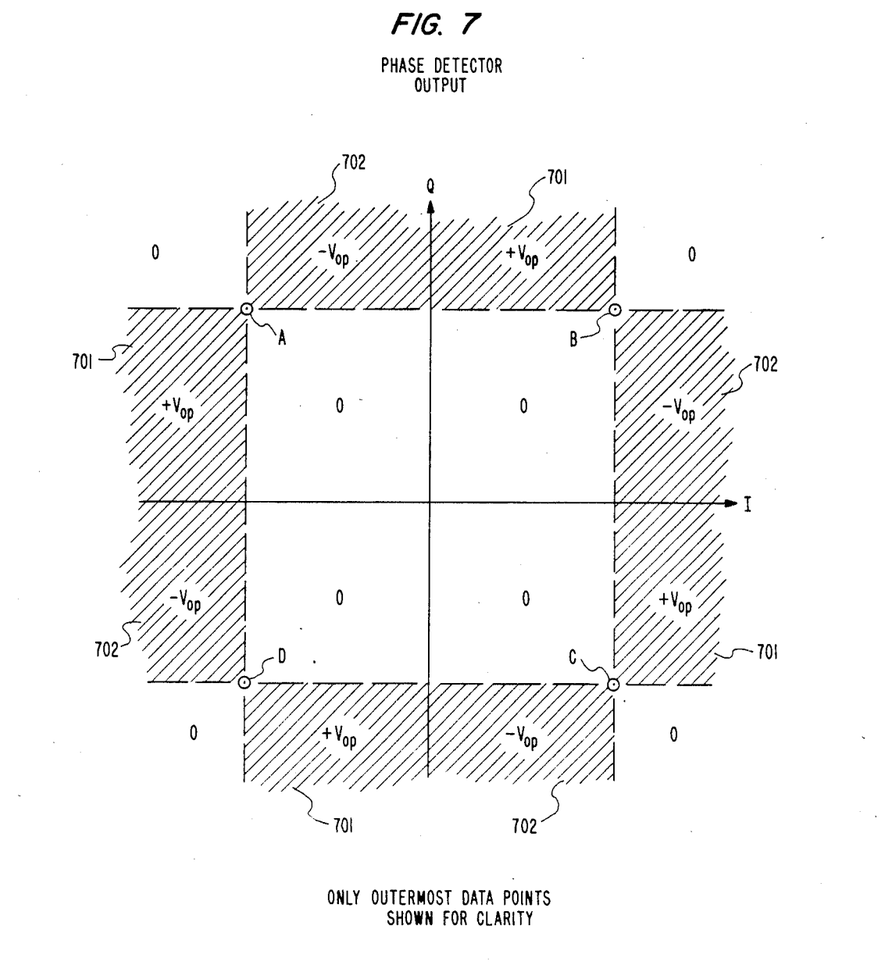
FIG. 7 is a plot of the superposition of FIGS. 4 and 5 indicating the polarity of the phase error signal generated by the carrier recovery circuit of FIG. 1.

Logic circuit 109 indicates the existence of any phase error by detecting data point occurrences in the category 1 or category 2 regions. To do this, each of the logical expressions of Table A is formed and the logical OR of the expressions for regions 501–504 and the logical OR of the expressions for regions 601–604 are produced and coupled to leads 115 and 114, respectively. Accordingly, logic circuit 109 outputs a logical "1" signal on lead 115 when a data point occurs in any of the category 1 regions and a logical "1" on lead 116 when a data point occurs in any of the category 2 regions. It should be noted that portions of the category 1 and category 2 regions overlap one another and the existence of a data point in these overlapped portions provides ambiguous phase error information. This ambiguity is handled by feeding the outputs of logic circuit 109 to difference amplifier 120 with an output voltage swing of $V_{op}$. FIG. 7 shows the value of the phase error signal on lead 122 as a function of where the I and Q channel data fall in the signal-space diagram. Data falling within periphery 210 and within the overlapping portions of the category 1 and category 2 regions generate a logical "0" phase error signal. However, data falling in first selected region 701 lying outside of periphery 210 generate a $+V_{op}$ phase error signal while data falling in second selected region 702, also lying outside of periphery 210, generate a $-V_{op}$ phase error signal. Examining regions 701 and 702, it will be noted that a phase error signal is generated when the I component at a selected time is outside of a specified range and the Q component is within a specified range at the selected times and vice versa. The specifical range for the I component extends from line AD to line BC and the specified range for the Q component extends from line DC to line AB (FIG. 7). While these ranges are substantially the same since the disclosed periphery shape is square, these ranges can be different from one another and are determined by the data on the I and Q rails.

The value and polarity of the phase error signal phase align the receiver-generated carrier produced by VCO 106 and $\pi/2$ phase shifter 108 to the quadrature-related carriers in the signal on lead 100. It is preferable, however, to supply the phase error signal to VCO 106 after it has passed through conventional loop filter 121 so as to average the fluctuations in the output of difference amplifier 120.

It should, of course, be understood that while the present invention has been described in terms of a particular embodiment, various modifications and changes may be made by those skilled in the art without departing from the spirit and scope of the invention. First, for example, while the present invention has been described in reference to a 64 QAM signal, the invention is applicable to any QAM, PSK, APSK, etc., format in which the periphery formed by the interconnection of the outermost data points with straight lines is any shape other than circular. Second, while the thresholds of the A/D converter in phase detector 10 are adaptive, the phase detector will also work, albeit with less sensitivity to phase error, if the thresholds are fixed. The fixed thresholds can correspond to some preselected values such as the ideal received amplitude values of $\pm 1$, $\pm 3$, $\pm 5$ and $\pm 7$ volts, for the illustrative 64 QAM signal.

What is claimed is:

1. A carrier recovery circuit for use in a communications system wherein the amplitudes of quadrature-related carrier signals determine data points in a signal-space diagram, said circuit comprising
    means for generating quadrature-related reference carriers,
    means for sensing the amplitudes of said quadrature-related carrier signals relative to thresholds passing through outermost ones of said data points, said outermost data points forming a periphery, when interconnected by straight lines, which encompasses all of said data points, and
    means responsive to said sensing means for generating a phase error signal which drives said reference carriers toward phase alignment with said carrier signals, said generating means generating said phase error signal when said sensed amplitudes fall only in selected regions of said signal-space diagram lying outside of said periphery and not when said sensed amplitudes fall in regions of said signal-space diagram within said periphery.

2. The carrier recovery circuit of claim 1 wherein said signal-space diagram has an origin and said outermost data points are those points furthest from said origin.

3. The carrier recovery circuit of claim 1 wherein said periphery formed encompasses all of said data points in a minimum area.

4. The carrier recovery circuit of claim 1 wherein said sensing means senses said amplitudes at selected times.

5. The carrier recovery circuit of claim 1 wherein said thresholds are fixed.

6. The carrier recovery circuit of claim 1 wherein said thresholds are varied so as to compensate for distortion in said quadrature-related carrier signals.

7. The carrier recovery circuit of claim 1 wherein said sensing means comprises analog-to-digital converters.

8. The carrier recovery circuit of claim 1 wherein said selected regions include first and second portions.

9. The carrier recovery circuit of claim 8 wherein said phase error signal has a different polarity for each of said portions.

10. Apparatus for detecting the phase of amplitude-modulated, quadrature-related carrier signals relative to reference carrier signals wherein the amplitudes of said quadrature-related carriers determine data points in a signal-space diagram, said apparatus comprising
    means for sensing the amplitudes of said carriers relative to thresholds passing through outermost ones of said data points, said outermost data points forming a periphery when interconnected by straight lines which encompasses all of said data points, and
    means responsive to said sensing means for generating a phase error signal when the sensed amplitudes fall only in selected regions of said signal-space diagram lying outside of said periphery and not when said sensed amplitudes fall in regions of said signal space diagram within said periphery.

11. The apparatus of claim 10 wherein said periphery encompasses all of said data points in a minimum area.

12. The apparatus of claim 10 wherein said signal-space diagram has an origin and said outermost data points are those furthest from said origin.

13. The apparatus of claim 10 wherein said thresholds are adjusted to compensate for the effects of distortion in said amplitude-modulated carriers.

14. The apparatus of claim 10 wherein said sensing means sense the amplitudes of said amplitude modulated carriers at selected times.

15. The apparatus of claim 10 wherein said thresholds are fixed.

16. A carrier recovery circuit comprising
    means for demodulating a received signal into a pair of signals using quadrature-related reference carriers, each signal in said pair having an amplitude,
    means for comparing the amplitude of each signal in said pair to an associated plurality of threshold values, the largest and smallest threshold values associated with each signal in said pair defining a range, and
    means responsive to said comparison means for generating a phase error signal which varies the phase of said reference carriers with respect to said quadrature-related carriers when the amplitude of one signal in said pair of outside of the associated range and the amplitude of the other signal in said pair is within the associated range and not when the amplitude comparisons of each signal in said pair yield different results.

17. The circuit of claim 16 wherein said associated ranges are the same.

18. The circuit of claim 16 wherein said associated ranges are different.

19. A phase detector for a carrier recovery circuit wherein an incoming signal is demodulated into a pair of signals, said phase detector comprising
    means for comparing each amplitude of said pair of signals to an associated plurality of threshold values, the largest and smallest threshold values associated with each signal in said pair defining a range, and
    means responsive to said comparison means for generating an output signal when the amplitude of one signal in said pair is outside of the associated range and the amplitude of the other signal in said pair is within the associated range and not when the amplitude comparisons of each signal in said pair yield different results.

* * * * *